(12) United States Patent
Kim et al.

(10) Patent No.: US 12,205,737 B2
(45) Date of Patent: Jan. 21, 2025

(54) METHOD FOR MANUFACTURING RARE EARTH PERMANENT MAGNET

(71) Applicant: STAR GROUP IND. CO., LTD, Daegu (KR)

(72) Inventors: Dong Hwan Kim, Daegu (KR); Koon Seung Kong, Daegu (KR)

(73) Assignee: STAR GROUP IND. CO., LTD, Daegu (KR)

( * ) Notice: Subject to any disclaimer, the term of this patent is extended or adjusted under 35 U.S.C. 154(b) by 1029 days.

(21) Appl. No.: 16/975,594

(22) PCT Filed: Sep. 13, 2018

(86) PCT No.: PCT/KR2018/010754
§ 371 (c)(1),
(2) Date: Aug. 25, 2020

(87) PCT Pub. No.: WO2019/212100
PCT Pub. Date: Nov. 7, 2019

(65) Prior Publication Data
US 2020/0395153 A1    Dec. 17, 2020

(30) Foreign Application Priority Data

Apr. 30, 2018   (KR) .................. 10-2018-0049999

(51) Int. Cl.
*H01F 1/057*   (2006.01)
*B22F 3/12*   (2006.01)
(Continued)

(52) U.S. Cl.
CPC .............. *H01F 1/0575* (2013.01); *B22F 3/12* (2013.01); *B22F 9/04* (2013.01); *H01F 41/0266* (2013.01);
(Continued)

(58) Field of Classification Search
CPC ............. H01F 41/0266; H01F 41/0293; H01F 1/0575; B22F 3/12; B22F 2201/10; B22F 9/04; B22F 2301/45
See application file for complete search history.

(56) References Cited

U.S. PATENT DOCUMENTS

2017/0062105 A1*   3/2017   Dong .................. B22F 9/023
2017/0221615 A1*   8/2017   Chen .................. H01F 1/0577

FOREIGN PATENT DOCUMENTS

JP   01-117303 A   5/1989
JP   H-01117303 A * 5/1989 ............. H01F 1/057
(Continued)

OTHER PUBLICATIONS

Fujita et al, "Magnetic Properties and Corrosion Characteristics of Nd-(Fe,Co,Ni)-B Pseudo-Ternary Systems", IEEE Translation Journal on Magnetics in Japan, Mar. 1991, vol. 6, No. 3.

*Primary Examiner* — Anthony M Liang
*Assistant Examiner* — Jacob J Gusewelle
(74) *Attorney, Agent, or Firm* — NKL LAW; Jae Youn Kim

(57) ABSTRACT

There is provided a method for manufacturing a rare earth sintered magnet to improve the high temperature demagnetization characteristic of the rare earth permanent magnet, by diffusing a heavy rare earth element to the grain boundary of a sintered magnet to improve the magnetic characteristics based on temperature.

1 Claim, 1 Drawing Sheet

(51) Int. Cl.
  *B22F 9/04*    (2006.01)
  *H01F 41/02*   (2006.01)
(52) U.S. Cl.
  CPC ...... *H01F 41/0293* (2013.01); *B22F 2201/10* (2013.01); *B22F 2301/45* (2013.01)

(56) References Cited

FOREIGN PATENT DOCUMENTS

| | | | | |
|---|---|---|---|---|
| JP | 2018-504769 | A | 2/2018 | |
| JP | 6281987 | B2 | 2/2018 | |
| KR | 10-1261099 | B1 | 5/2013 | |
| KR | 10-1447301 | B1 | 10/2014 | |
| KR | 10-1516567 | B1 * | 5/2015 | ........... H01F 1/0536 |
| KR | 10-2018-0038746 | A | 4/2018 | |
| WO | WO-2015003824 | A1 * | 1/2015 | ............. C04B 35/26 |

* cited by examiner

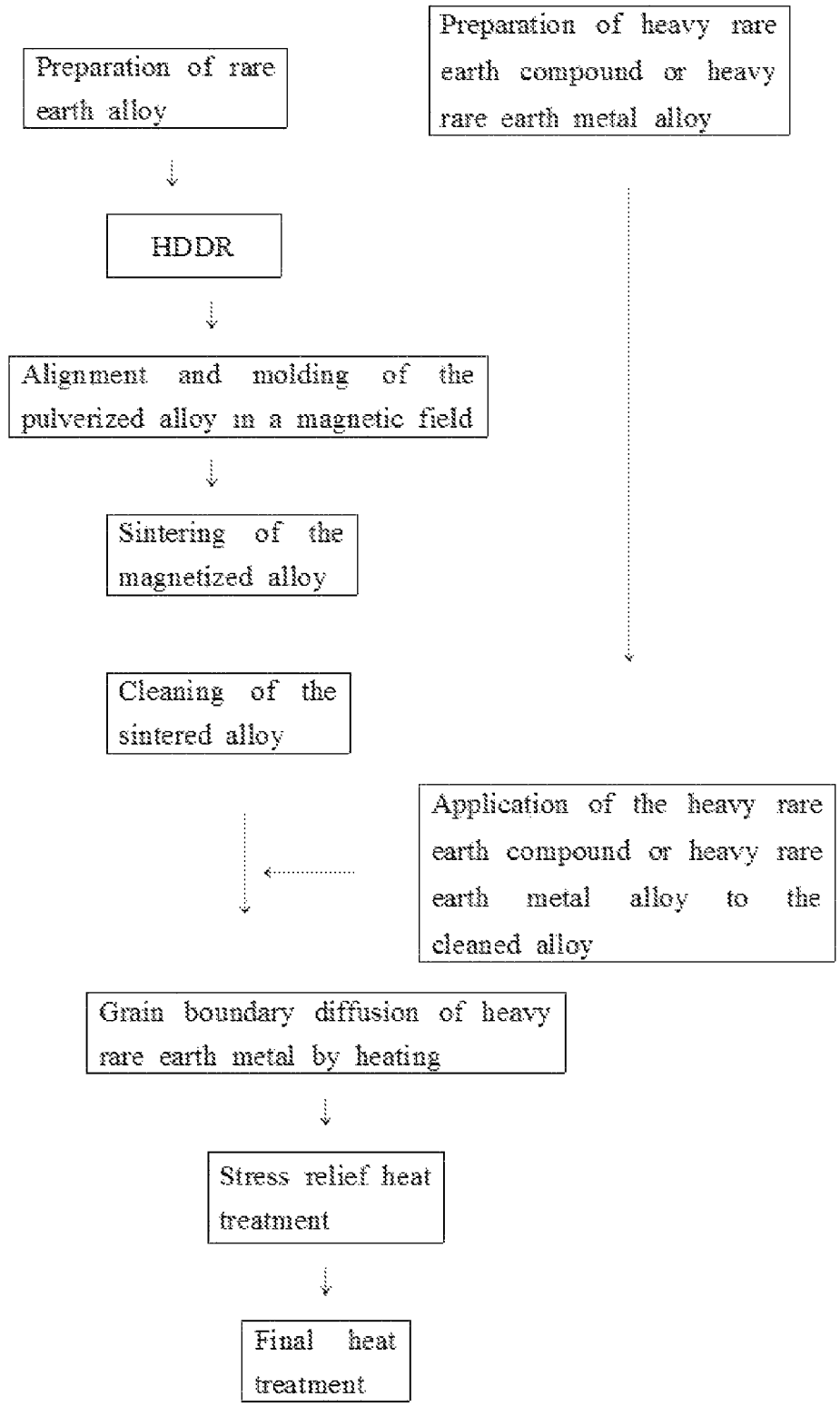

METHOD FOR MANUFACTURING RARE EARTH PERMANENT MAGNET

TECHNICAL FIELD

The present invention relates to a method for manufacturing a rare earth sintered magnet, and more particularly, to a method for manufacturing a rare earth sintered magnet by diffusing a heavy rare earth metal, gadolinium (Gd), or a mixture of heavy rare earth metals of Gd and neodymium (Nd), holmium (Ho), dysprosium (Dy) or terbium (Tb) to a grain boundary of the rare earth sintered magnet which is formed of a rare earth alloy composed of xwt % RE-ywt % B-zwt % TM-bal.wt % Fe (wherein RE is a rare earth element, TM is a 3d transition element, x=28~35, y=0.5~1.5 and z=0~15), to improve the temperature coefficient of residual magnetic flux density and the coercivity which are magnetic characteristics based on temperature.

BACKGROUND ART

As the demand of a sintered NdFeB magnet used for motors like hybrid vehicles, etc., has increasingly expanded, the sintered NdFeB magnet is required to have higher coercivity (Hcj). To increase the coercivity (Hcj) of the sintered NdFeB magnet, a method is known to substitute a part of Nd with Dy or Tb. However, there are problems in that the resource of Dy or Tb is not easily available or is ununiformly distributed and the residual magnetic flux density (Br) or the maximum energy product ((BH)max) of the sintered NdFeB magnet decreases by the substitution of these elements.

It has been recently found that the coercivity (Hcj) of a sintered NdFeB magnet can be increased, almost without decreasing the residual magnetic flux density (Br) of the sintered NdFeB magnet, by adhering Dy or Tb to the surface of the sintered NdFeB magnet by a sputtering process and heating it at 700~1000° C. (Non-Patent Documents 1~3).

The Dy or Tb adhered to the sintered NdFeB magnet is sent to the inside of a sintered compact through the grain boundary of the sintered compact and diffuses from the grain boundary into each particle of a main phase, $R_2Fe_{14}B$ (where R is a rare earth element) (grain boundary diffusion). Since R-rich phase of the grain boundary is liquefied by heating, the diffusion rate of Dy or Tb in the grain boundary is much faster than the diffusion rate from the grain boundary to the inside of the main phase particle.

The difference in diffusion rate is used to adjust the heat treatment temperature and time, thereby realizing over the entire sintered compact, a state that the concentration of Dy or Tb is high only in the area (surface area) which is very close to the grain boundary of the main phase particle in the sintered compact. Since the coercivity (Hcj) of the sintered NdFeB magnet is determined depending on the state of the surface area of the main phase particle, the sintered NdFeB magnet having a crystal grain with a high concentration of Dy or Tb in the surface area has high coercivity. Further, although the residual magnetic flux density (Br) drops when the concentration of Dy or Tb increases, the residual magnetic flux density (Br) of the entire main phase particle essentially does not drop since such an area where the decrease in Br occurs is only the surface area of each main phase particle. Thus, it is possible to manufacture a high performance magnet having high coercivity (Hcj) and having the residual magnetic flux density (Br) not so different from the sintered NdFeB magnet which is not substituted with Dy or Tb. This technique is called a grain boundary diffusion method.

Methods for industrially manufacturing a sintered NdFeB magnet by the grain boundary diffusion method have been already published. One method includes forming a fine powdered layer of a fluoride or oxide of Dy or Tb on the surface of a sintered NdFeB magnet and heating it. Another method includes burying a sintered NdFeB magnet in a mixed powder composed of the powder of a fluoride or oxide of Dy or Tb and the powder of calcium hydride and heating it (Non-Patent Documents 4 and 5).

When a part of Fe in a sintered NdFeB magnet is substituted with Ni or Co, the corrosion resistance of the magnet improves. If the total substitution percentage of Ni and Co is higher than 20~30%, the occurrence of rust does not show in the corrosion resistance test (temperature of 70° C., humidity of 95%, 48 hours) (Non-Patent Document 6).

However, when a large amount of Ni and Co is contained, it increases the price of the magnet and it is difficult to industrially use a sintered NdFeB magnet manufactured by this method.

The relevant techniques, which were proposed before the above-described grain boundary diffusion method was publicly known, include the technique of diffusing at least one of the elements, Tb, Dy, Al and Ga, in the proximity of the surface of a sintered NdFeB magnet to suppress the high temperature demagnetization (Patent Document 1) or the technique of coating the surface of a sintered NdFeB magnet with at least one of the elements, Nd, Pr, Dy, Ho and Tb, to prevent the deterioration of the magnetic characteristics due to processing deterioration (Patent Document 2).

There is a need to improve the coercivity by suppressing the high temperature demagnetization by diffusing at least one of the elements, Tb, Dy, Al and Ga, in the proximity of the surface of a sintered NdFeB magnet.

PRIOR ART DOCUMENTS

Patent Documents

[Patent Document 1] Japanese Unexamined Patent Application Publication No. H01-117303
[Patent Document 2] Japanese Unexamined Patent Application Publication No. S62-074048
[Patent Document 3] Korean Registered Patent No. 10-1447301

Non-Patent Documents

[Non-Patent Document 1] K T Park et al, "Effect of Metal-Coating and Consecutive Heat Treatment on Coercivity of Thin Nd—Fe—B Sintered magnets", Proceedings of the Sixteenth International Workshop on Rare-Earth Magnets and their Applications (2000), pp 257-264
[Non-Patent Document 2] Naoyuki Ishigaki et al, "Surface Modification and Characteristics Improvement of Micro-sized Neodymium Sintered Magnet", NEOMAX Technical Report, published by kabushiki Kaisha NEOMAX, vol 15 (2005), pp 15-19
[Non-Patent Document 3] Ken-ichi Machida et al, "Grain Boundary Modification and Magnetic Characteristics of Sintered NdFeB Magnet", Speech Summaries of 2004 Spring Meeting of Japan Society of Powder and Powder Metallurgy, published by the Japan Society of Powder and Powder Metallurgy, 1-47A

[Non-Patent Document 4] Kouichi Hirota et al, "Increase in Coercivity of Sintered NdFeB Magnet by Grain Boundary Diffusion Method", Speech Summaries of 2005 Spring Meeting of Japan Society of Powder and Powder Metallurgy, published by the Japan Society of Powder and Powder Metallurgy, p 143

[Non-Patent Document 5] Ken-ichi Machida et al, "Magnetic Characteristics of Sintered NdFeB Magnet with Modified Grain Boundary", Speech Summaries of 2005 Spring Meeting of Japan Society of Powder and Powder Metallurgy, published by the Japan Society of Powder and Powder Metallurgy, p 144

[Non-Patent Document 6] Yasutaka Fukuda et al, "Magnetic Properties and Corrosion Characteristics of Nd—(Fe,Co,Ni)—B Pseudo-Ternary Systems", Kawasaki Steel Technical Report, published by Kawasaki Steel Corporation, vol 21(1989), No 4, pp 312-315

DISCLOSURE

Technical Problem

Therefore, it is an object of the present invention to solve the above problems and to provide a method for manufacturing a rare earth sintered magnet by diffusing a heavy rare earth metal, gadolinium (Gd), or a mixture of heavy rare earth metals, Gd and neodymium (Nd), holmium (Ho), dysprosium (Dy) or terbium (Tb), to a grain boundary of an Nd—Fe—B sintered magnet, to improve the temperature coefficient of residual magnetic flux density and the coercivity which are magnetic characteristics according to a temperature of the Nd—Fe—B sintered magnet.

Technical Solution

The present invention provides a method for manufacturing a rare earth sintered magnet comprising the steps:
preparing a rare earth alloy composed of xwt % RE-ywt % B-zwt % TM-bal.wt % Fe (wherein RE is a rare earth element, TM is a 3d transition element, x=28~35, y=0.5~1.5 and z=0~15);
pulverizing the prepared alloy to a size of 1.0~5.0 μm;
aligning and compacting the pulverized alloy in a magnetic field, to be magnetized;
sintering the magnetized alloy;
cleaning the sintered alloy;
preparing a slurry by mulling a heavy rare earth compound or heavy rare earth metal alloy and a liquid dispersing agent and applying the slurry to the surface of the cleaned alloy;
loading the alloy applied with the slurry into a heating furnace and diffusion a heavy rare earth element to a grain boundary of the alloy under a vacuum or in an inert gas atmosphere;
loading the alloy with the grain boundary to which the heavy rare earth element has been diffused, into the heating furnace, and performing a stress relief heat treatment under a vacuum or in an inert gas atmosphere; and
performing a final heat treatment.

In the method for manufacturing a rare earth sintered magnet according to the present invention, the heavy rare earth compound is one of the compounds which are Gd-Hydride, Gd-Fluoride, Gd-Oxide, Gd-Oxyfluoride, Nd-Hydride, Ho-Fluoride, Ho-Hydride, Dy-Hydride, Dy-Fluoride, Tb-Hydride and Tb-Fluoride as powders.

The heavy rare earth metal alloy is one of the alloys which are Gd—Al, Gd—Cu and Gd—Ag.

The slurry is prepared by mulling the solid powder of the heavy rare earth compound or heavy rare earth metal alloy of 40~60% by volume and the liquid dispersing agent of 40~60% by volume.

The solid powder in the slurry includes the heavy rare earth compound(s) and the heavy rare earth metal alloy(s).

The solid powder in the slurry is a mixture of one or more of the Gd-compound powders or Gd metal alloy powders and one or more of the compound powders which are Nd-Hydride, Ho-Fluoride, Ho-Hydride, Dy-Hydride, Dy-Fluoride, Tb-Hydride and Tb-Fluoride.

In the rare earth alloy composed of xwt % RE-ywt % B-zwt % TM-bal.wt % Fe (RE is a rare earth element, TM is a 3d transition element, x=28~35, y=0.5~1.5 and z=0~15), the RE includes one or more of the rare earth metals which are Nd, Pr, La, Ce, Ho, Dy and Tb.

In the rare earth alloy composed of xwt % RE-ywt % B-zwt % TM-bal.wt % Fe (RE is a rare earth element, TM is a 3d transition element, x=28~35, y=0.5~1.5 and z=0~15), the TM includes one or more of the 3d transition elements which are Co, Cu, Al, Ga, Nb, Ti, Mo, V, Zr and Zn.

In the rare earth alloy composed of xwt % RE-ywt % B-zwt % TM-bal.wt % Fe (RE is a rare earth element, TM is a 3d transition element, x=28~35, y=0.5~1.5 and z=0~15), the x is within a range of 28~35, y within a range of 0.5~1.5 and z is with in a range of 0~15.

An alloy compact obtained by being compacted in a magnetic field is loaded into a sintering furnace and sufficiently maintained at 400° C. and below, under a vacuum, to completely remove the remaining impure organic matters.

The compact is further sintered under the sintering conditions: temperature of 900~1,200° C., maintenance time of 0.5~3 hours and under a vacuum or in an argon atmosphere, etc., preferably, at 1,000~1,100° C. and for 1~2.5 hours.

In the step of diffusing the heavy rare earth element to the grain boundary of the alloy, the diffusion process is performed at 400~1,000° C. up to 10 times.

After diffusing the heavy rare earth element to the grain boundary of the alloy and removing the slurry layer remaining on the surface of the alloy, the stress relief heat treatment is performed at 400~1,000° C. for 2~15 hours, preferably, at 850~950° C. for 8~12 hours, more preferably, at 900° C. for 10 hours.

After the stress relief heat treatment, the final heat treatment is performed at 400~600° C. for 0.5~3 hours, preferably, at 450~550° C. for 1.5~2.5 hours.

Advantageous Effects

As described above, in accordance with the method for manufacturing a rare earth sintered magnet of the present invention, the diffusion of the heavy rare earth metal, Gd, or the mixture of the heavy rear earth metals, Gd and Nd, Gd and Ho, Gd and Dy, and/or Gd and Tb, to the grain boundary of the Nd—Fe—B sintered magnet improves the temperature coefficient of residual magnetic flux density and the coercivity which are magnetic characteristics according to a temperature of the Nd—Fe—B sintered magnet.

DESCRIPTION OF DRAWINGS

The above and other features and advantages of the present invention will become more apparent by describing in detail exemplary embodiments thereof with reference to the attached drawing(s) in which:

FIG. 1 is a flow chart illustrating a process of a method for manufacturing a rare earth sintered magnet according to the present invention.

MODE FOR INVENTION

The present invention will now be described more fully hereinafter with reference to the accompanying drawing(s), in which preferred embodiments of the invention are shown.

[Manufacturing Method]

(1) Step of Preparing a Rare Earth Alloy Powder

A raw material powder is prepared as the powder to form a rare earth alloy. When the rare earth alloy is composed of at least one selected from the rare earth elements (RE=Nd, Pr, La, Ce, Ho, Dy and Tb), Fe, at least one selected from the 3d transition elements (TM=Co, Cu, Al, Ga, Nb, Ti, Mo, V, Zr and Zn) and/or B, an RE-Fe alloy, an RE-Fe-TM alloy, an RE-Fe—B alloy and an RE-Fe-TM-B alloy are obtained. More specifically, the rare earth alloys are an Nd—Fe—B alloy, an Nd—Fe—Co alloy, an Nd—Fe—Co—B alloy, etc. The powder composed of the rare earth alloy, which is publicly known to be used for a rare earth sintered magnet, can be used as the raw material powder.

The raw material powder is the alloy composed of xwt % RE-ywt % B-zwt % TM-bal.wt % Fe (RE is a rare earth element, TM is a 3d transition element, x=28~35, y=0.5~1.5 and z=0~15).

The raw material powder of the alloy having a desired composition is manufactured by pulverizing a foil, which is obtained by melting and casting an ingot or a rapid solidification method, by a pulverizing device such as a jet mill, attribution mill, ball mill, Attritor grinding mill, ball mill, vibration mill, etc. or by an atomizing method such a gas atomizing method. The powder which is obtained by the publicly known method for manufacturing a powder or which is manufactured by the atomizing method may be further pulverized for use. The particle-size distribution of the raw material powder or the shape of each particle forming the powder is adjustable by properly changing the pulverizing conditions and manufacturing conditions. Although the shape of the particle does not particularly matter, the closer it is to a sphere, the easier it is to get densification, and it is easy for the particle to rotate by application of a magnetic field. In the case of using the atomizing method, the powder with a high sphericalness can be obtained.

In the process of coarsely pulverizing the manufactured alloy strip, the strip is loaded into a vacuum furnace for vacuum-exhaust and then maintained for 2 hours or more in a hydrogen atmosphere at room temperature so that hydrogen is absorbed into the strip. Subsequently, the strip is heated at 600° C. under a vacuum to remove the hydrogen which is present in the strip.

(Hydrogenation-Disproportionation-Desorption-Recombination (HDDR) Process)

The HDDR-processed and coarsely pulverized powder is prepared as a uniform and fine powder with an average particle diameter of 1~5.0 μm by the pulverizing method using the jet mill technique in a nitrogen or inert gas atmosphere.

The finer the raw material powder is, the more easily the packing density is increased. Thus, the maximum particle diameter is preferably equal to or smaller than 5.0 μm.

(2) Step of Aligning and Compacting in a Magnetic Field

A lubricant may be added to the raw material powder. In the case of using a mixture including a lubricant, since it becomes easy for each particle forming the raw material powder to rotate upon applying a magnetic field, it is easy to increase the alignment. Lubricants which have different material qualities and forms (liquid state, solid state) that do not substantially react with the raw material powder may be used. For example, liquid lubricants include ethanol, machine oil, silicone oil, castor oil, etc. and solid lubricants include metallic salts, such as zinc stearate, etc., hexagonal boron nitride, wax, etc. The amount of a liquid lubricant added is about 0.01~10% by mass for the raw material powder of 100 g and the amount of the solid lubricant added is about 0.01~5% by mass for the mass of the raw material powder.

A mold in a desired shape and size is prepared to obtain a compact in the desired shape and size. A mold, which is used to manufacture the powder compact used as a material of the conventional sintered magnet and typically comprises a die, an upper punch and a lower punch, may be used. Otherwise, a cold isostatic press can be used.

When a mold is filled with the raw material powder, the powder is completely aligned in a high magnetic field, which is generated by applying pulsed current to electromagnets positioned at the right and left of the mold, in a nitrogen atmosphere. Subsequently, compacting is performed simultaneously while maintaining the orientation of the powder which has been already completely aligned by a DC magnetic field generated by applying direct current, to manufacture the compact.

(3) Step of Sintering

The compact obtained by being compacted in a magnetic field is loaded into a sintering furnace and sufficiently maintained at 400° C. or below, under a vacuum, so that the remaining impure organic matters are completely removed.

The compact is sintered under the sintering conditions of a temperature of 900~1,200° C., for 0.5~3 hours, under a vacuum or in an argon atmosphere, etc. Preferably, the temperature range is 1,000~1,100° C. and the maintenance time is 1~2.5 hours.

The sintered compact is processed as a magnet of 12.5*12.5*5 mm in size.

After the processed magnet is divided into a predetermined size and it is put into an alkali degreasing agent solution, the processed magnet is rubbed with ceramic balls to remove any oil constituent on the surface of the magnet. The magnet is cleaned with distilled water several times, to completely remove the remaining degreasing agent.

(4) Step of Applying Heavy Rare Earth Compound Slurry to the Rare Earth Sintered Compact The present invention is to improve the coercivity and the temperature characteristics of the residual magnetic flux density by adding a small amount of Gd. When Gd is added to the RE-Fe—B-based alloy, the Curie temperature rises to improve the temperature coefficient of the residual magnetic flux density. When a small amount (about 1%) of Gd is added, the coercivity increases and when Gd is added in a greater amount than that, the coercivity shows a tendency of decreasing.

Thus, the present invention is to improve the temperature coefficient of the residual magnetic flux density and the coercivity simultaneously, by adding a small amount of Gd by using the grain boundary diffusion process.

In the step of applying the rare earth compound slurry over the rare earth sintered compact, a heavy rare earth slurry, which is prepared by mulling a solid powder of a heavy rare earth compound or a heavy rare earth metal alloy of 40~60% by volume and a liquid dispersing agent of 40~60% by volume, is put in a container to be uniformly dispersed by using a mixer (magnetic stirrer) and the processed magnet is set therein to be maintained for 1~2 minutes. Then, the heavy rare earth slurry is applied to the surface of the processed magnet.

The liquid dispersing agent may be alcohol.

The heavy rare earth compound is one or more of the compounds which are Gd-Hydride, Gd-Fluoride, Gd-Oxide, Gd-Oxyfluoride, Nd-Hydride, Ho-Fluoride, Ho-Hydride, Dy-Hydride, Dy-Fluoride, Tb-Hydride and Tb-Fluoride as powders.

The heavy rare earth compound may be a mixture of the Gd compound and one or more of the compounds which are Nd-Hydride, Ho-Fluoride, Ho-Hydride, Dy-Hydride, Dy-Fluoride, Tb-Hydride and Tb-Fluoride as powders.

The Gd compound may be Gd-Hybride.

The heavy rare earth metal alloy may be one of the alloys, Gd—Al, Gd—Cu and Gd—Ag.

The solid powder in the slurry may be a mixture of one or more of the Gd compound powders or Gd metal alloy powders and one or more of the compound powders which are Nd-Hydride, Ho-Fluoride, Ho-Hydride, Dy-Hydride, Dy-Fluoride, Tb-Hydride and Tb-Fluoride.

The heavy rare earth compound powder which is the solid powder in the slurry contains hydrogen (H), fluorine (F) and oxygen (O) in the form of a compound, which are separated and released upon heating for the grain boundary diffusion process to be described later. The gas, such as the released hydrogen, etc., may contribute to reduce a powder particle size. The heavy rare earth elements, Gd, Nd, Ho, Dy and Tb, are released by heating, to be diffused to the grain boundary.

The Gd, which is in a solid solution in the Gd—Al alloy, Gd—Cu alloy and Gd—Ag alloy which are the solid powders in the slurry, is released by heating, to be diffused to the grain boundary.

An average particle diameter of the solid powder used in the present invention is equal to or smaller than 5 µm, preferably 4 µm, more preferably 3 µm. If the diameter is too large, it is difficult to be alloyed with a matrix structure and trouble occurs in adhesion to the matrix structure of the surface layer to be formed. As the diameter is smaller, the surface layer of high density is formed after heating. A small diameter is better even to use the surface layer as a corrosion-protective layer. Therefore, there is no specific lower limit of the diameter. If costs are not considered, super fines of tens-of nanometers (nm) is ideal but the practically most preferable average particle diameter of the metal powders is about 0.3~3 µm.

(5) Step of Diffusing the Heavy Rare Earth Element to the Grain Boundary

To diffuse the heavy rare earth metal, which has been released from the heavy rare earth compound or heavy rear earth metal alloy applied to the grain boundary inside the magnet, the magnet applied with the heavy rare earth compound or heavy rear earth alloy is loaded into the heating furnace and heated at the heating rate=1° C./min. in an argon atmosphere, and maintained at 700~1,000° C. for 1~10 hours such that the heavy rare earth compound or heavy rare earth metal alloy is released as the heavy rare earth element to be diffused into the magnet, to progress a reactive infiltration.

It is preferable to maintain at 900° C. for 6 hours, 800° C. for 10 hours, or 850° C. for 9 hours.

The above-described heating makes it easy to perform the grain boundary diffusion method and therefore the high characterization of the sintered magnet, namely, the residual magnetic flux density (Br) or the maximum energy product ((BH)max), is maintained to be higher before the grain boundary diffusion process is performed and the coercivity (Hcj) is high. As reported, the grain boundary diffusion method has a great effect for a thin magnet and it is specially effective for a thickness which is equal to or smaller than 5 mm.

(6) Step of Performing a Stress Relief Heat Treatment and a Final Heat Treatment After the slurry layer remaining on the surface is removed after the grain boundary diffusion process, a stress relief heat treatment is performed at 400~1,000° C. for 2~15 hours, preferably, 850~950° C. for 8~12 hours.

After the stress relief heat treatment, a final heat treatment is performed at 400~600° C. for 0.5~3 hours, preferably, 450~550° C. for 1.5~2.5 hours.

The present invention will be more specifically described with reference to the examples below:

Example 1

In Example 1, an alloy composed of xwt % RE-ywt % B-zwt % TM-bal.wt % Fe (wherein RE is a rare earth element, TM is a 3d transition element, x=28~35, y=0.5~1.5 and z=0~15) was melted in an argon atmosphere by an induction heating method and subsequently was rapidly cooled by a strip casting method, to prepare an alloy strip.

In the process of coarsely pulverizing the prepared alloy strip, the alloy strip was loaded into a vacuum furnace for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The HDDR-processed and coarsely pulverized powder was prepared as a uniform and fine powder with an average particle diameter of 1~5.0 µm by a pulverizing method using the jet mill technique. The process of preparing the alloy strip as the fine powder was performed in a nitrogen or inert gas atmosphere, to prevent the deterioration of magnetic characteristics by contamination of oxygen.

The fine rare earth powder which had been pulverized by the jet mill was used to perform a process of compacting in a magnetic field as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into the sintering furnace and sufficiently maintained at 400° C. or below, under a vacuum, to completely remove the remaining impure organic matters, and further maintained at 1,050° C. for 2 hours, to perform the sintering densification process.

After the sintered compact was prepared by the above-described sintering process, the sintered compact was processed as a magnet of 12.5*12.5*5 mm in size.

After the processed magnet was put in the alkali degreasing agent solution, the processed magnet was rubbed with ceramic balls to remove any oil constituent on the surface of the magnet. The magnet was cleaned with distilled water several times, to completely remove the remaining degreasing agent.

To uniformly apply a heavy rare earth element to the surface of the cleaned processed magnet, a Gd-Hydride compound and alcohol as a liquid dispersing agent were adjusted to 50%:50% and uniformly mulled to prepare a Gd-Hydride compound slurry. The prepared slurry was put into each beaker such that the slurry should be uniformly dispersed by using a mixer. The processed magnet was set therein and maintained for 1~2 minutes such that the Gd-Hydride compound slurry was uniformly applied to the surface of the processed magnet.

To improve the high temperature magnetic characteristics of the processed permanent magnet applied with the Gd-Hydride compound slurry, the grain boundary diffusion process was performed as follows:

To diffuse the Gd-Hydride compound to the grain boundary inside the magnet, the processed magnet applied with the Gd-Hydride compound slurry was loaded into the heating furnace, heated at the heating rate=1° C./min. in an argon atmosphere and maintained at 900° C. for 6 hours so that Gd, which was released from the Gd-Hydride compound slurry, was diffused into the magnet, to progress a reactive infiltration. After the diffusion layer was removed after the grain boundary diffusion process, the stress relief heat treatment was performed at 900° C. for 10 hours and subsequently the final heat treatment was performed at 500° C. for 2 hours.

Table 1 shows the evaluation results of magnetic characteristics of the magnets manufactured by performing the slurry-application process and the grain boundary diffusion process by preparing the sintered compact composed of xwt % Nd-1 wt % B-2 wt % TM-bal.wt % Fe (wherein TM=Cu, Al, Nb, Co, x=30~34) and then using the Gd-Hydride compound slurry as a material applied to the magnets during the grain boundary diffusion preparation process.

Table 1 shows the changes in magnetic characteristics according to the rare earth content of each of the magnets.

perature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element, Gd, is diffused to the grain boundary of the permanent magnet composed of xwt % Nd-1 wt % B-2 wt % TM-bal.wt % Fe, the temperature characteristics are improved and the coercivity at room temperature is improved.

Example 2

In Example 2, an alloy composed of 32 wt % RE-1 wt % B-2 wt % TM-bal.wt % Fe (wherein RE is a rare earth element and TM is a 3d transition element) was melted, in an argon atmosphere, by an induction heating method and subsequently was rapidly cooled by a strip casting method, to prepare an alloy strip.

In the process of coarsely pulverizing the prepared alloy strip, the alloy strip was loaded into a vacuum furnace for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in

TABLE 1

| Sample preparation conditions | x | Process conditions Applied material | Amount of the applied material (wt %) | Magnetic characteristics at room temperature Residual magnetic flux density, Br (kG) | Coercivity, Hcj (kOe) | Temperature characteristics Br decrease rate based on temperature (%/° C.) | Hcj decrease rate based on temperature (%/° C.) |
|---|---|---|---|---|---|---|---|
| Comparative example | 32 | | | 13.5 | 14.5 | −0.120 | −0.65 |
| Example 1-1 | 30 | Gd-Hydride | 1.0 | 13.8 | 15.0 | −0.078 | −0.65 |
| Example 1-2 | 31 | Gd-Hydride | 1.0 | 13.6 | 15.8 | −0.080 | −0.65 |
| Example 1-3 | 32 | Gd-Hydride | 1.0 | 13.4 | 16.3 | −0.079 | −0.65 |
| Example 1-4 | 33 | Gd-Hydride | 1.0 | 13.2 | 16.8 | −0.081 | −0.65 |
| Example 1-5 | 34 | Gd-Hydride | 1.0 | 13.0 | 17.2 | −0.077 | −0.65 |

The comparative example shows the room temperature magnetic characteristics and the temperature characteristics of a magnet with no diffusion of a heavy rare earth element to the grain boundary. Examples 1-1 through 1-5 show the room temperature magnetic characteristics and the temperature characteristics of magnets after the grain boundary diffusion was performed, each magnet wherein a mass ratio of Nd was different in the composition ratio of xwt % Nd-1 wt % B-2 wt % TM-bal.wt % Fe and the Gd-Hydride compound slurry was applied.

As observation results, when Gd was diffused to the grain boundary of each of the permanent magnets composed of xwt % Nd-1 wt % B-2 wt % TM-bal.wt % Fe, it was confirmed that the coercivity was increased at room temthe alloy strip. The HDDR-processed and coarsely pulverized powder was prepared as a uniform and fine powder with an average particle diameter of 1~5.0 μm by a pulverizing method using the jet mill technique. The process of preparing the alloy strip as the fine powder was performed in a nitrogen or inert gas atmosphere, to prevent the deterioration of magnetic characteristics by contamination of oxygen.

The fine rare earth powder pulverized by the jet mill was used to perform a process of compacting in a magnetic field as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into the sintering furnace and sufficiently maintained at 400° C. or below, under a vacuum, to completely remove the remaining impure organic matters, and further maintained at 1,050° C. for 2 hours, to perform the sintering densification process.

After the sintered compact was prepared by the above-described sintering process, the sintered compact was processed as a magnet of 12.5*12.5*5 mm in size.

After the processed magnet was put in the alkali degreasing agent solution, the processed magnet was rubbed with ceramic balls to remove any oil constituent on the surface of the magnet. The magnet was cleaned with distilled water several times, to completely remove the remaining degreasing agent.

To uniformly apply a Gd compound or a Gd metal alloy to the surface of the cleaned processed magnet, each of the Gd-Hydride compound, Gd-Fluoride compound, Gd—Al alloy, Gd—Cu alloy and Gd—Ag alloy to alcohol were adjusted to 50%:50% and uniformly mulled to prepare Gd compound slurries or Gd metal alloy slurries. The prepared slurry was put into each beaker such that the slurry should be uniformly dispersed by using a mixer. Each of the prepared slurries was put into each beaker to be uniformly dispersed by using a mixer. Each of the processed magnets was set in each beaker and then maintained for 1~2 minutes such that each of the Gd compound slurries and Gd metal alloy slurries was uniformly applied to the surface of the processed magnet.

To improve the high temperature magnetic characteristics of the processed permanent magnet applied with the Gd compound slurry or Gd metal alloy slurry, the grain boundary diffusion process was performed as follows:

To diffuse the Gd compound or Gd metal alloy to the grain boundary inside the magnet, the processed magnet applied with the Gd compound slurry or Gd metal alloy slurry was loaded into the heating furnace, heated at the heating rate=1° C./min. in an argon atmosphere and maintained at 900° C. for 6 hours so that Gd, which was released from the Gd compound slurry or Gd metal alloy slurry, was diffused into the magnet, to progress a reactive infiltration. After the diffusion layer was removed after the grain boundary diffusion process, the stress relief heat treatment was performed at 900° C. for 10 hours and subsequently the final heat treatment was performed at 500° C. for 2 hours.

Table 2 shows the evaluation results of magnetic characteristics of the magnets manufactured by performing the slurry-application process and the grain boundary diffusion process, by preparing the sintered compact composed of 32 wt % Nd-1 wt % B-2 wt % TM-bal.wt % Fe (wherein TM=Cu, Al, Nb, Co) and then using the Gd-Hydride compound, Gd-Fluoride compound, Gd—Al alloy, Gd—Cu alloy and Gd—Ag alloy Gd-Hydride compound slurry as the materials applied to the magnets during the grain boundary diffusion preparation process.

Table 2 shows changes in magnetic characteristics according to the materials applied to the magnets composed of 32 wt % Nd-1 wt % B-2 wt % TM-bal.wt % Fe (wherein TM=Cu, Al, Nb, Co).

TABLE 2

| Sample preparation conditions | Process conditions | | | Magnetic characteristics at room temperature | | Temperature characteristics | |
|---|---|---|---|---|---|---|---|
| | Applied material | Amount of the applied material (wt %) | Diffusion conditions | Residual magnetic flux density, Br (kG) | Coercivity, Hcj (kOe) | Br decrease rate based on temperature (%/° C.) | Hcj decrease rate based on temperature (%/° C.) |
| Comparative example | | | | 13.5 | 14.5 | −0.120 | -0.65 |
| Example 1-3 | Gd-Hydride | 1.0 | 900° C. 6 hours | 13.4 | 16.3 | −0.079 | −0.65 |
| Example 2-1 | Gd-Fluoride | 1.0 | 900° C. 6 hours | 13.4 | 15.5 | −0.083 | −0.65 |
| Example 2-2 | Gd-Al | 1.0 | 900° C. 6 hours | 13.4 | 15.3 | −0.085 | −0.65 |
| Example 2-3 | Gd-Cu | 1.0 | 900° C. 6 hours | 13.4 | 15.8 | −0.088 | −0.65 |
| Example 2-4 | Gd-Ag | 1.0 | 900° C. 6 hours | 13.4 | 15.5 | −0.087 | −0.65 |

In Table 2, the comparative example shows the room temperature magnetic characteristics and temperature characteristics of the magnet with no diffusion of a heavy rare earth element to the grain boundary. Example 1-3 shows the room temperature magnetic characteristics and the temperature characteristics of the magnet composed of 32 wt % Nd-1 wt % B-2 wt % TM-bal.wt % Fe, which was applied with the Gd-Hydride slurry to perform the grain boundary diffusion.

Examples 2-1 through 2-4 show the room temperature magnetic characteristics and the temperature characteristics of the magnets composed of 32 wt % Nd-1 wt % B-2 wt % TM-bal.wt % Fe, wherein the Gd-Fluoride compound slurry, Gd—Al alloy slurry, Gd—Cu alloy slurry and Gd—Ag alloy slurry were respectively applied to be diffused to the grain boundaries.

As observation results, when Gd was diffused to the grain boundary of each of the permanent magnets composed of 32 wt % Nd-1 wt % B-2 wt % TM-bal.wt % Fe, it was confirmed that the coercivity was increased at room temperature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element, Gd, is diffused to the grain boundary of the permanent magnet composed of 32 wt % Nd-1 wt % B-2 wt % TM-bal.wt % Fe, the magnetic characteristics based on temperature are improved and the coercivity at room temperature is improved.

Example 3

In Example 3, an alloy composed of 32 wt % RE-1 wt % B-2 wt % TM-bal.wt % Fe (wherein RE is a rare earth element and TM is a 3d transition element) was melted, in an argon atmosphere, by an induction heating method and subsequently was rapidly cooled by a strip casting method, to prepare an alloy strip.

In the process of coarsely pulverizing the prepared alloy strip, the alloy strip was loaded into a vacuum furnace to for vacuum-exhaust and then maintained in a hydrogen atmosphere for 2 hours or more, to allow hydrogen to be absorbed into the alloy strip. Subsequently, the alloy strip was heated at 600° C. under a vacuum, to remove hydrogen present in the alloy strip. The HDDR-processed and coarsely pulverized powder was prepared as a uniform and fine powder with an average particle diameter of 1~5.0 μm by a pulverizing method using the jet mill technique. The process of preparing the alloy strip as the fine powder was performed in a nitrogen or inert gas atmosphere, to prevent the deterioration of magnetic characteristics by contamination of oxygen.

The fine rare earth powder which had been pulverized by the jet mill was used to perform a process of compacting in a magnetic field as follows: When a mold was filled with the rare earth powder in a nitrogen atmosphere, the rare earth powder was aligned to a uniaxial direction by applying a DC magnetic field by electromagnets positioned at the right and left of the mold and was compacted by applying pressure of upper and lower punches simultaneously, to make a compact.

The compact obtained by the compacting method in a magnetic field was loaded into the sintering furnace and sufficiently maintained at 400° C. or below, under a vacuum, to completely remove the remaining impure organic matters, and further maintained at 1,050° C. for 2 hours, to perform the sintering densification process.

After the sintered compact was prepared by the above-described sintering process, the sintered compact was processed as a magnet of 12.5*12.5*5 mm in size.

After the processed magnet was put in the alkali degreasing agent solution, the processed magnet was rubbed with ceramic balls to remove any oil constituent on the surface of the magnet. The magnet was cleaned with distilled water several times, to completely remove the remaining degreasing agent.

To uniformly apply a heavy rare earth element to the surface of the cleaned processed magnet, a mixture of Gd-Hydride and Nd-Hydride powders, a mixture of Gd-Hydride and Ho-Hydride powders, a mixture of Gd-Hydride and Dy-Hydride powders and a mixture of Gd-Hydride and Tb-Hydride powders were prepared and each mixture and alcohol were adjusted to 50%:50% to be uniformly mulled, to prepare the heavy rare earth compound slurries. The prepared slurry was put into each beaker such that the slurry should be uniformly dispersed by using a mixer. Each of the prepared slurries was put into each beaker to be uniformly dispersed by using a mixer. Each of the processed magnets was set in each beaker and then maintained for 1~2 minutes such that the heavy rare earth elements were uniformly applied to the surface of the processed magnet.

To improve the high temperature magnetic characteristics of the processed permanent magnet applied with the Gd-Hydride and Nd-Hydride, Gd-Hydride and Ho-Hydride, Gd-Hydride and Dy-Hydride and Gd-Hydride or Tb-Hydride powder mixture slurry, the grain boundary diffusion process was performed as follows:

To diffuse the heavy rare earth compounds of Gd, Nd, Ho, Dy and Tb to the grain boundary inside the magnets, the processed magnets applied with the heavy rare earth compound slurries were loaded into the heating furnace, heated at the heating rate=1° C./min. in an argon atmosphere and maintained at 900° C. for 6 hours, such that the heavy rare earth elements which were released from the heavy rare earth compound slurries, were diffused into the magnets, to progress a reactive infiltration. After the diffusion layer was removed after the grain boundary diffusion process, the stress relief heat treatment was performed at 900° C. for 10 hours and subsequently the final heat treatment was performed at 500° C. for 2 hours.

Table 3 shows evaluation results of magnetic characteristics of the magnets manufactured by performing the slurry-application process and the grain boundary diffusion process, by preparing the sintered compact composed of 32 wt % Nd-1 wt % B-2 wt % TM-bal.wt % Fe (wherein TM=Cu, Al, Nb, Co) and then using the Gd-Hydride and Nd-Hydride, Gd-Hydride and Ho-Hydride, Gd-Hydride and Dy-Hydride, and Gd-Hydride and Tb-Hydride powder mixtures as the materials applied to the magnets during the grain boundary diffusion preparation process.

Table 3 shows changes in magnetic characteristics according to the mixing rate of the materials applied to the magnets composed of 32 wt % Nd-1 wt % B-2 wt % TM-bal.wt % Fe (wherein TM=Cu, Al, Nb, Co).

TABLE 3

| Sample preparation conditions | Process conditions | | | Magnetic characteristics at room temperature | | Temperature characteristics | |
|---|---|---|---|---|---|---|---|
| | Applied material 1 | Applied material 2 | Applied material 1:Applied material 2 | Residual magnetic flux density, Br (kG) | Coercivity, Hcj (kOe) | Br decrease rate based on temperature (%/° C.) | Hcj decrease rate based on temperature (%/° C.) |
| Example 1-3 | Gd-Hydride | | | 13.4 | 16.3 | −0.079 | −0.65 |
| Example 3-1 | Gd-Hydride | Nd-Hydride | 1:1 | 13.4 | 16.3 | −0.079 | −0.65 |

TABLE 3-continued

| | Process conditions | | | Magnetic characteristics at room temperature | | Temperature characteristics | |
|---|---|---|---|---|---|---|---|
| Sample preparation conditions | Applied material 1 | Applied material 2 | Applied material 1:Applied material 2 | Residual magnetic flux density, Br (kG) | Coercivity, Hcj (kOe) | Br decrease rate based on temperature (%/° C.) | Hcj decrease rate based on temperature (%/° C.) |
| Example 3-2 | Gd-Hydride | Ho-Hydride | 1:1 | 13.4 | 17.5 | −0.074 | −0.58 |
| Example 3-3 | Gd-Hydride | Dy-Hydride | 1:1 | 13.4 | 20.2 | −0.065 | −0.50 |
| Example 3-4 | Gd-Hydride | Tb-Hydride | 1:1 | 13.4 | 23.7 | −0.055 | −0.43 |

In Table 3, Example 1~3 shows the room temperature magnetic characteristics and the temperature characteristics of the magnet composed of 32 wt % Nd-1 wt % B-2 wt % TM-bal.wt % Fe, which was applied with the Gd-Hydride slurry to perform the grain boundary diffusion.

Examples 3~1 through 3~4 each show the room temperature magnetic characteristics and the temperature characteristics of the magnets composed of 32 wt % Nd-1 wt % B-2 wt % TM-bal.wt % Fe, wherein the Gd-Hydride and Nd-Hydride, Gd-Hydride and Ho-Hydride, Gd-Hydride and Dy-Hydride, and Gd-Hydride and Tb-Hydride powder mixture slurries, mixed at 1:1, were respectively applied to be diffused to the grain boundaries.

As observation results, when the heavy rare earth element mixtures of Gd and Nd, Gd and Ho, Gd and Dy, and Gd and Tb were diffused to the grain boundaries of the magnets composed of 32 wt % Nd-1 wt % B-2 wt % TM-bal.wt % Fe, it was confirmed that the coercivity was increased at room temperature and the absolute value of the decrease rate of the residual magnetic flux density based on temperature was lowered.

The point that the decrease rate of the residual magnetic flux density based on temperature is minus means that the characteristics based on temperature decreases, and the point that the absolute value lowers means that the decrease of performance based on temperature is reduced.

Accordingly, it is confirmed that when the heavy rare earth element mixtures of Gd and Nd, Gd and Ho, Gd and Dy, and Gd and Tb were diffused to the grain boundaries of the permanent magnets composed of 32 wt % Nd-1 wt % B-2 wt % TM-bal.wt % Fe, the magnetic characteristics based on temperature are improved and the coercivity at room temperature is improved.

While the present invention has been particularly shown and described with reference to examples thereof, it will be understood by those of ordinary skill in the art that various modifications and alternative arrangements in form and details may be made therein without departing from the spirit and scope of the present invention as defined by the following claims. The scope of the claims, therefore, should be accorded the broadest interpretation so as to encompass all such modifications and similar arrangements. For example, the compositions of the raw material powders, the shape or size of the compact, the rate of applying a magnetic field, the sintering conditions, etc. may be properly modified.

The invention claimed is:

1. A method for manufacturing a rare earth sintered magnet, the method comprising the steps of:
   preparing a rare earth alloy composed of xwt % RE-ywt % B-zwt % TM-bal.wt % Fe, wherein RE is a rare earth element, TM is a 3d transition element, x=28-35, y=0.5-1.5, and z=0-15;
   pulverizing the prepared alloy to a size of 1.0-5.0 μm;
   aligning and compacting the pulverized alloy in a magnetic field, to be magnetized, wherein a lubricant is added to the pulverized alloy, the lubricant includes a liquid lubricant and a solid lubricant, the liquid lubricant includes ethanol, machine oil, silicone oil, and castor oil, and the solid lubricant includes metallic salts, hexagonal boron nitride, and wax;
   sintering the magnetized alloy;
   cleaning the sintered alloy;
   preparing a slurry by mulling a solid-state powder of one of a Gd—Al alloy, a Gd—Cu alloy, and a Gd—Ag alloy of 40-60% by volume and a liquid dispersing agent of 40-60% by volume, and applying the slurry to the surface of the cleaned and sintered alloy, wherein Gd in the applied slurry has a concentration of 1 wt % as to the alloy applied with the slurry;
   loading the alloy applied with the slurry into a heating furnace and diffusing a heavy rare earth element to a grain boundary of the alloy under a vacuum or in an inert gas atmosphere;
   loading the alloy with the grain boundary to which the heavy rare earth element has been diffused, into the heating furnace and performing a stress relief heat treatment under a vacuum or in an inert gas atmosphere; and
   performing a final heat treatment.

* * * * *